(12) United States Patent
Rauenbuehler et al.

(10) Patent No.: US 11,356,352 B2
(45) Date of Patent: Jun. 7, 2022

(54) IDENTIFYING REACHABILITY OF NETWORK-CONNECTED DEVICES

(71) Applicant: Apple Inc., Cupertino, CA (US)

(72) Inventors: Keith W. Rauenbuehler, San Francisco, CA (US); Nicholas J. Circosta, Mountain View, CA (US); Kenneth A. York, San Jose, CA (US); Christopher Ku, San Jose, CA (US); Adam J. Moore, San Francisco, CA (US); Jose A. Lozano Hinojosa, Sunnyvale, CA (US); Aniket A. Zamwar, Sunnyvale, CA (US); Patrick L. Coffman, San Francisco, CA (US)

(73) Assignee: Apple Inc., Cupertino, CA (US)

(*) Notice: Subject to any disclaimer, the term of this patent is extended or adjusted under 35 U.S.C. 154(b) by 5 days.

(21) Appl. No.: 17/032,619

(22) Filed: Sep. 25, 2020

(65) Prior Publication Data

US 2021/0385144 A1   Dec. 9, 2021

Related U.S. Application Data

(60) Provisional application No. 63/034,110, filed on Jun. 3, 2020.

(51) Int. Cl.
*H04L 12/26* (2006.01)
*H04L 43/10* (2022.01)
*H04L 12/28* (2006.01)

(52) U.S. Cl.
CPC .......... *H04L 43/10* (2013.01); *H04L 12/2854* (2013.01)

(58) Field of Classification Search
CPC ........................... H04L 43/10; H04L 12/2854
See application file for complete search history.

(56) References Cited

U.S. PATENT DOCUMENTS

| | | | |
|---|---|---|---|
| 8,189,577 B2 | 5/2012 | Vaswani et al. | |
| 8,365,010 B2 | 1/2013 | Olson et al. | |
| 9,883,027 B2* | 1/2018 | Dave | H04M 3/42 |
| 10,217,068 B1* | 2/2019 | Davis | G06Q 10/06311 |
| 10,425,475 B2 | 9/2019 | Cahana et al. | |
| 2015/0131648 A1 | 5/2015 | Shuman et al. | |
| 2016/0043827 A1* | 2/2016 | Filson | H04K 3/226 |
| | | | 370/252 |
| 2017/0257226 A1* | 9/2017 | Bi | H04L 12/2825 |
| 2019/0155659 A1 | 5/2019 | Rodriguez Bravo et al. | |

* cited by examiner

*Primary Examiner* — Mohamed A. Wasel
(74) *Attorney, Agent, or Firm* — Kilpatrick Townsend & Stockton LLP

(57) ABSTRACT

Techniques are disclosed for transmitting a message to a user device in accordance with a determination that another device is unreachable over a network. In one example, a server device, at a first location, may identify a controller device resident at a second location, whereby the controller device is configured to communicate with a router at the second location. The server device may also receive a list of user devices. The server device may transmit a ping message to the controller device via the router to determine whether the controller device is unreachable by the server device. The server device may subsequently transmit a message to a user device on the list in accordance with a determination that the controller device is unreachable by the server device, whereby the message includes instructions for the user device to determine whether the controller device is unreachable by the user device.

20 Claims, 6 Drawing Sheets

IDENTIFYING REACHABILITY OF NETWORK-CONNECTED DEVICES

CROSS-REFERENCES TO RELATED APPLICATIONS

The present application claims the benefit of and priority to U.S. Provisional Application No. 63/034,110, filed Jun. 3, 2020, entitled "IDENTIFYING REACHABILITY OF NETWORK-CONNECTED DEVICES." The entire contents of which are incorporated herein by reference for all purposes. This application is related to U.S. Provisional Application No. 63/034,262, filed Jun. 3, 2020, entitled "ACTIVITY ZONE FOR CAMERA VIDEO." This application is also related to U.S. Provisional Application No. 63/034,114, filed Jun. 3, 2020, entitled "IDENTIFYING OBJECTS WITHIN IMAGES FROM DIFFERENT SOURCES."

BACKGROUND

Techniques exist for determining whether a computing device is unreachable by another computing device. Consider a scenario in which home automation system performs one or more tasks in a home environment (e.g., adjusting a thermostat, sending reminders for events, etc.). It may be important for a user device of the home environment to be informed if the home automation system is unreachable, and may not be able to perform one or more of the assigned tasks. However, sometimes a process for the user device determining that the home automation system is unreachable may be inefficient (e.g., energy intensive) and/or cumbersome for an end-user.

DETAILED DESCRIPTION

Figure 1:
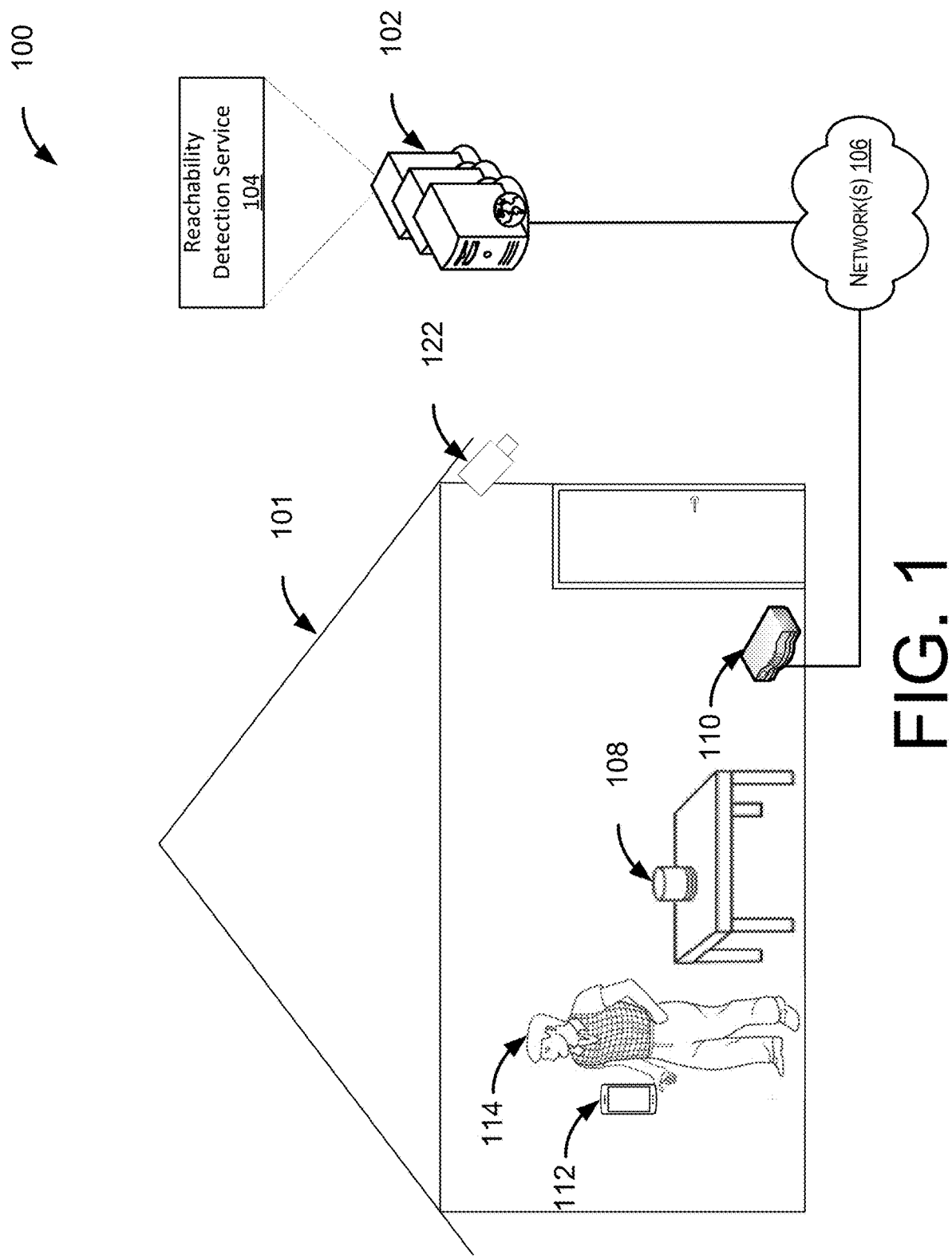
FIG. 1 is a simplified block diagram of an example system, according to some embodiments.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Embodiments of the present disclosure can provide techniques for determining a reachability of a network-connected computing device. In one example, a user may want to be notified if a resident device is unreachable over a network. The residence device may be any suitable type of controller device, including, for example, a tablet, a mobile phone, a smart speaker device, a smart digital media player configured to control a television (TV), etc. In this example, a remote server device may first determine if the resident device is reachable by the server by periodically pinging the resident device (e.g., via a ping message). If the remote server determines that the resident device is unreachable, the remote server may send a message to a user device, instructing the user device to determine (e.g., confirm) for itself whether the resident device is unreachable (e.g., by sending a ping from the user device to the resident device). Upon the user device determining that the resident device is unreachable by the user device, the user device may notify the user accordingly. In another example, the resident device may be connected to an accessory device (e.g., an observation camera mounted at the front door of the home). In this example, the resident device may first detect whether the camera is unreachable (e.g., offline), for example, based on periodically pinging the camera, and, at some point in time, detecting a cessation of replies (e.g., responses) from the camera. The resident device may then subsequently notify one or more user devices that the camera is offline (and/or when the camera comes back online). As illustrated by both examples above and as described further herein, these techniques may enable a user device to more efficiently determine whether a resident device and/or accessory device is unreachable and to improve the user experience of notifying the user (e.g., only presenting one notification of unreachability on the user device.).

In an illustrative example that corresponds to the first example above, consider a first scenario in which a controller device (e.g., a resident device) within a home environment performs one or more tasks. For example, the controller device (e.g., a smart speaker) may announce certain reminders each day, access the Internet, play music, respond to queries by a user via the speaker, control accessories, etc. In this example, a user may want to be notified by their user device if the smart speaker, resident in their home environment, is unreachable over one or more networks. In some embodiments, the smart speaker may be connected to a Wide Area Network (WAN) (e.g., the Internet) via a router (e.g., an edge router), and the smart speaker may further be connected to a Local Area Network (LAN) within the home environment (e.g., via a suitable protocol, such as WiFi or other protocols as described below). As described herein, it should be understood a LAN may describe any suitable computer network that interconnects electronic devices within a limited area (e.g., a home environment). Accordingly, other suitable network protocols (e.g., Bluetooth, Thread, ZigBee, etc.) may be utilized within the context of a LAN, for example, allowing a user device (e.g., a mobile phone) to communicate directly with the smart speaker and without necessarily using TCP/IP as is used with WiFi in a "traditional" LAN configuration.

A server device at a remote location (e.g., part of a cloud computing platform) may transmit a ping message to the smart speaker periodically (e.g., every few seconds, once a minute, once every few minutes, etc.) over the Internet via the router, whereby the server device may utilize the ping message to determine the reachability of the smart speaker by the server device. For example, if the smart speaker stops replying to the ping message (e.g., stops sending a response/acknowledgement message), the server device may detect that the smart speaker has become unreachable. In some embodiments, the server device may also receive (e.g., from the smart speaker) and/or maintain a list of user devices and/or user profiles. For example, the server device may maintain a list of user profiles of users associated with the home environment and/or the smart speaker (e.g., administrators, shared users, etc.). Each user profile may be associated with one or more user devices of the respective user. Accordingly, the server may receive and/or maintain a list of user devices of respective user profiles that are associated with the smart speaker. The server device may be further configured to transmit a message to at least one user device of the list of user devices upon the server device determining that the smart speaker is unreachable by the server device via the router.

Continuing with the first illustrative example above, the server device may detect that the smart speaker is unreachable via the router based at least in part on detecting that the smart speaker is no longer acknowledging ping messages from the server device. The server device may then transmit a message to at least one user device (of the list of user devices) that includes instructions for the user device (e.g., a mobile phone) to confirm that the smart speaker is unreachable by the user device. For example, upon receiving the instructions, the user device may then ping the smart speaker (e.g., via the router using WiFi protocol) to determine whether the smart speaker is unreachable. Upon determining that the smart speaker is unreachable by the user device (e.g., not replying to ping messages), the user device may present a notification to the user that the smart speaker is unreachable.

In some embodiments, instead of (and/or in addition to) the server device periodically sending a ping message (i.e., "pinging") to a controller device (e.g., and receiving an acknowledgement/response) to determine reachability, the controller device may transmit a periodic "heartbeat" signal to the server device. If the server device stops receiving heartbeats from the smart speaker via the router for a period of time (e.g., a few seconds, a minute, a few minutes, etc.), the server device may determine that the controller device is unreachable by the server device. It should be understood that heartbeats (e.g., a heartbeat protocol) may be used in any suitable context, whereby a periodic signal is sent from a source to an endpoint. For example, as described in another example below, a heartbeat protocol may be used between an accessory device and a controller device, whereby the accessory device (e.g., camera) transmits a heartbeat on a periodic interval to the controller device. Any suitable protocols and/or combination thereof may be used by a computing device (e.g., a server device, controller device, user device, etc.) to determine reachability over a network.

In some embodiments, the server device may transmit one or more messages to one or more user devices upon determining the unreachability (and/or later reachability) of a controller device. For example, and continuing with the first illustrative example above, after sending the message to at least one user device of the list of user devices to notify the user device that the controller device may be unreachable, the server device may subsequently detect (e.g., by subsequently pinging the controller device, and/or newly received heartbeats) that the controller device is reachable again. In some embodiments, the server device may then transmit a message to notify the user device(s) that the controller device is reachable again by the server device. Accordingly, in some embodiments, user devices may receive a series of subsequent messages from the server device, each corresponding to whether the controller device is reachable or unreachable. In some embodiments, even though each user device may receive one or more messages from the server device (e.g., indicating unreachability and/or reachability), a respective user device may determine to only prompt the user with a notification after the particular user device determines (i.e., for itself) that the controller device is unreachable by the user device. To further illustrate, suppose that the user device (e.g., the mobile phone) is away from the home environment (e.g., on an airplane). While the user device is on the airplane (e.g., and not able to receive messages), the server device may transmit several messages to the user device indicating that the smart speaker in the home environment associated with the user device may be offline (e.g., unreachable by the server device). Once the user device is subsequently able to receive messages, the user device may receive each of these messages. However, instead of transmitting a notification for each message (e.g., "Smart Speaker is Online," "Smart Speaker is Offline," etc.), the user device may determine to check for itself whether the smart speaker is offline (e.g., pinging the smart speaker via the Internet, or, if the user device is within the home environment, via the LAN using a suitable LAN protocol). Upon determining for itself that the smart speaker is offline, the user device may then prompt a single notification message to the user. If the user device determines that the smart speaker is reachable by the user device, the user device may suppress any notification to the user.

In a second illustrative example, consider a scenario in which a controller device (e.g., the smart speaker from the above example) may be connected to an accessory device (e.g., an observation camera) via the LAN. For example, as described above, the observation camera may be mounted somewhere at the home environment (e.g., within or outside the home), and may transmit images (e.g., via WiFi or other communication protocol over the LAN) to the controller device for processing by the controller device (e.g., to determine that someone has arrived and announce the arrival via the speaker). In this example, the smart speaker may receive a list of one or more user devices (e.g., mobile phones, smart watches, etc.), at least one of which is to be informed if the observation camera becomes unreachable by the smart speaker over the LAN. In one example, the smart speaker may transmit a ping message to the observation camera on any suitable cadence (e.g., once per ten seconds, per minute, per five minutes, etc.). Based at least in part on not receiving an acknowledgement to the ping message from the observation camera, the smart speaker may determine that the observation camera is unreachable over the LAN. In some embodiments, as described above, instead of initiating a ping message to determine unreachability, the smart speaker may utilize a heartbeat protocol (e.g., detecting heartbeat signals received from the observation camera) to determine if the observation camera is unreachable (e.g., if the heartbeats are no longer received according to the predefined periodic interval). In some embodiments, the smart speaker may log the time that the observation camera was detected as being unreachable. In some embodiments, the smart speaker may also log the time that the observation camera become reachable again. The smart speaker may then transmit a notification to at least one user device of the list of user devices in accordance with the determination that the observation camera is unreachable over the LAN. In some embodiments, user device may then present a notification that the observation camera is unreachable over the LAN. In some embodiments, the notification may contain any suitable information, including, but not limited to, one or more times that the observation camera was logged as being unreachable (e.g., offline) and/or reachable (e.g., online), the LAN protocol (e.g., WiFi, BlueTooth, etc.) used by the smart speaker to determine reachability/unreachability, etc.

The embodiments of the present disclosure provide several technical advantages over existing systems. In one example, embodiments of the present disclosure provide techniques for more efficiently determining whether a controller device and/or an accessory device is unreachable. For example, some conventional techniques may involve a user device (e.g., mobile phone) pinging a controller device (e.g., smart speaker) periodically to determine if the controller device is unreachable. Upon determining that the controller device is unreachable, the user device may then prompt the user with a notification. In some cases, having a user device regularly ping a controller device to determine reachability increases inefficiency. For example, often a user device may have a limited power supply (e.g., being on battery power) and/or may transmit messages via a wireless protocol that may require power utilization. When considered over a long-term period of time (e.g., continuously), and with regular ping intervals, the amount of power utilized (e.g., battery drainage) by a user device may be considerable. In some embodiments of the present disclosure, by having the server device (e.g., instead of the user device) regularly ping the controller device, the resource utilization required by the user device is reduced, thus increasing efficiency. It should be understood that this technical advantage may be realized in either of the illustrations described above (e.g., having the server device ping the controller device to assess reachability of the controller device, and/or having the controller device ping the accessory device to assess reachability of the accessory device).

In another example of a technical advantage, embodiments of the present disclosure may improve a user experience and reduce resource consumption by reducing the number of notifications presented on a user device. For example, as described above with respect to the first illustration, the server device may transmit multiple messages to the user device, respectively indicating a reachability or unreachability of the controller device. Instead of a user device prompting the user with a notification whenever the server device transmits a message to the user device indicating unreachability of the controller device, the user device may determine for itself whether the controller device is reachable or not. For example, the user device may ping the controller device via the WAN (e.g., the Internet) or the LAN (e.g., via WiFi, Bluetooth, etc.). If the user device determines unreachability of the controller device, the user may be prompted with a single notification message. Alternatively, consider if the messages from the server device are stale (e.g., in the earlier airplane example), and, when the user device later pings the controller device, the controller device is reachable. In this case, the user device may suppress any notification to the user. By having the user device only prompt the user about unreachability when the information is up-to-date and verified, embodiments of the present disclosure may improve the user experience by simplifying user device management. Embodiments may also reduce resource consumption on the user device by reducing the number of notifications being displayed. When considering the resource savings over substantial period of time, and, considering that user devices may be sensitive to energy consumption (e.g., smart watches, mobile phones, etc.), embodiments increase resource utilization efficiency.

For clarity of illustration, it should be understood that, although embodiments of the present disclosure are primarily directed to determining reachability of a resident device and/or accessory device in a home environment, embodiments should not be construed to be so limited. For example, a controller device (e.g., smart speaker, a smart digital media player configured to control a television (TV), etc.) and/or an accessory device (e.g., an observation camera, smart thermostat, etc.) may be used in a work building, a gymnasium, or other suitable defined environment. Also, although embodiments of the present disclosure primarily address determining reachability (e.g., of a controller device or accessory device) via a ping message, embodiments should not be construed to be so limited. For example, as described above, a heartbeat protocol may be used.

FIG. 1 is a simplified block diagram 100 that illustrates an example environment, according to some embodiments. In FIG. 1, the example environment depicted includes a home environment 101. The home environment 101 may correspond to a defined (e.g., limited) area and/or structure (e.g., dwelling unit), whereby one or more user profiles (e.g., of family members, roommates, etc.) have some affiliation with the home environment 101. Each user profile that is affiliated with the home environment 101 may also be affiliated with one or more user devices (e.g., a smart watch, mobile phone, tablet, etc.). In this example, user 114 may represent an affiliated user who has a user profile that is associated with user device 112. Also within the home environment 101 may be a controller device 108 (e.g., a tablet, a smart home controller, a smart digital media player, a home automation device, or the like). In some embodiments, the controller device 108 may typically be resident within the home environment. The controller device 108 may be communicatively connected to one or more accessory devices, each of which are also affiliated with (e.g., positioned in) the home environment 101 (e.g., an observation camera 122). In one example, the controller device 108 may receive images (e.g., video frames) from the observation camera 122 for determining whether a person is outside the front door, and then notify a user (e.g., via a speaker announcement). The home environment 101 may also include a router 110. The router 110 may be communicatively connected (e.g., via a LAN, described herein) to one or more of the devices affiliated with the home environment 101 (e.g., user device 112, controller device 108, observation camera 122, etc.). The router 110 may also be connected to one or more external network(s) 106 outside the home environment 101 (e.g., a WAN, such as the Internet). In some embodiments, the router 110 may operate as an edge (e.g., boundary) router that provides connectivity between the LAN (e.g., which is operating in the home environment 101) and the network 106. For example, a server device 102 may be connected to the router 110 via the network 106. The server device 102 may execute a reachability detection service 104 that may perform one or more of the operations described in reference to embodiments of the present disclosure. For example, the reachability detection service 104 may be responsible for determining if the controller device 108 is reachable by the server device 102, and, if not, transmitting an instruction(s) to the user device 112. Upon receiving the instructions, the user device 112 may further determine if the controller device 108 is reachable by the user device 112. If not, then the user device 112 may provide for presentation (e.g., on a display of the user device 112) a notification to the user.

Turning to the elements of FIG. 1 in further detail, in some embodiments, the server device 102 may be any suitable server computer. In some embodiments, the server device 102 may be accessible via a WAN (e.g., the Internet). In some embodiments, the server device 102 can be a large mainframe, a minicomputer cluster, or a group of servers functioning as a unit (e.g., as part of a cloud computing platform that is connected to the WAN). In one example, the server device 102 may comprise one or more computational apparatuses and may use any of a variety of computing structures, arrangements, and compilations for servicing the requests from one or more client computers. For example, the server device 102 may execute the reachability detection service 104, described herein.

In some embodiments, network 106 may correspond to any suitable WAN that extends over a wide geographic area. Although, as described herein, network 106 may typically correspond to the Internet, embodiments should not be construed to be so limited. For example, consider a scenario in which home environment 101 corresponds to an apartment. The apartment may be one of several apartments in a campus that is spread out over a wide area (e.g., across several campuses in a city, a country, etc.). In this example, the network 106 may correspond to a private WAN that connects devices of the campus(es) together.

In some embodiments, the router 110 may be any suitable computer networking device. As described herein, in some embodiments, the router 110 may operate as an edge router, and may transmit data packets between one or more networks. For example, the router 110 may ensure connectivity between the external network 106 (e.g., the Internet) and an internal network (e.g., a LAN) associated with the home environment 101. It should be understood that, as described herein, the various networks involved may utilize different network protocols and/or techniques to route data packets. In one example, network packets traveling via network 106 may use Internet Protocol (IP) addresses that are suitable for the global Internet. In another example, when network packets that travel via the network 106 arrive at the router 110, the router 110 may determine a destination device for the data packets, and may assign another IP address (e.g., a local IP address) that is suitable for devices communicating within a subnetwork (e.g., subnet) that corresponds to the LAN of the home environment 101.

As described above and referenced herein, the LAN may describe any suitable computer network that interconnects electronic devices within a limited area (e.g., the home environment 101). For example the LAN may include a computer network(s) (e.g., a personal area network (PAN), and/or wireless PAN) that interconnects devices such as computers, mobile phones (e.g., user device 112), tablets, controller devices (e.g., controller device 108), routers (e.g., router 110), wearable devices, etc. Accordingly, the LAN may utilize one or more network connection protocols, including, but not limited to, a Bluetooth connection, an Infrared connection, a ZigBee connection, a Thread connection, a WiFi connection, etc. In some embodiments, network traffic that is sent over the LAN may utilize the router 110. In some embodiments, network traffic that is sent over the LAN may not utilize the router 110 (e.g., being sent directly to another device).

In some embodiments, controller device 108 may be any suitable computing device that resides in a particular environment (e.g., home environment 101) and is configured to control (e.g., provide control instructions) one or more operations and/or accessory devices in the environment. In some embodiments, the controller device 108 may transmit one or more messages to (and/or receive messages from) one or more user devices and/or accessory devices that are affiliated with the controller device 108, as described further herein. In some examples, the controller device 108 may utilize the router 110 to transmit messages to (and/or receive messages from) other user devices and/or accessory devices of the home environment 101 (e.g., utilizing the LAN of the home environment 101). In some embodiments, the controller device 108 may communicate directly with one or more other devices (e.g., accessory devices and/or user devices), using any suitable protocol supported by the LAN (e.g., Bluetooth). In some embodiments, the controller device may also communicate with external devices (e.g., server device 102) utilizing the router 110 and/or network 106. In some embodiments, controller device 108 and router 110 may be housed within the same physical unit (e.g., operating as one computing device). In some non-limiting examples, a controller device may be a smart speaker, a tablet device, a smart digital media player (e.g., configured to provide streaming media to a TV), etc. In the example of FIG. 1, controller device 108 may correspond to a smart speaker device. In some embodiments, there may be more than one controller device associated with a home environment 101. In some embodiments, the one or more controller devices may perform operations to synchronize (e.g., and/or coordinate operations) with each other. For example, controller device 108 may be selected among other controller devices of the home environment 101 to perform one or more operations of the present disclosure. Accordingly, other controller devices may route messages related to these operations (e.g., communicating to/from server device 102, user device 112, and/or observational camera 122) to controller device 108.

In some embodiments, the controller device 108 may perform one or more operations that are similar to one or more operations performed by the reachability detection service 104 of server device 102. For example, as described herein, the controller device 108 may ping an accessory device (e.g., observation camera 122) over the LAN to determine if the observation camera 122 is reachable via the LAN. If not, the controller device 108 may transmit a notification to one or more user devices (e.g., user device 112) in accordance with the determination that the observation camera 122 is unreachable over the LAN.

In some embodiments, a user device (e.g., user device 112) may be any suitable computing device. In a non-limiting example, the user device may be a mobile phone, a tablet, a PC, a laptop, a smart watch, other wearable devices, etc. In some embodiments, the user device 112 may transmit messages to (and/or receive messages from) one or more other devices in the home environment 101 via the router 110 (e.g., controller device 108, observational camera 122). In some embodiments, the user device 112 may directly communicate with devices in the home environment 101 without using the router 110 (e.g., via the LAN, using any suitable protocols and/or combination thereof, such as Bluetooth, Thread, etc.). In some embodiments, the user device 112 may communicate with one or more devices external to the home environment 101 via the router 110 and/or network 106. For example, suppose that the user device 112 may presently be within the home environment 101. The server device 102 may transmit a message to the user device 112 over the network 106 to the router 110, and then the router 110 may route the message (e.g., as an intermediary) to the user device 112 over the LAN (e.g., using WiFi, etc.), and/or vice versa. In another example, the user device 112 may communicate with external devices (e.g., server device 102)

without using the router 110 as an intermediary device. For example, using an earlier example, suppose that the user device 112 leaves the home environment 101 (e.g., but is still affiliated with the home environment 101) and is carried on an airplane to another destination. When the user device 112 arrives at the destination, the user device 112 may still receive messages from (and/or transmit messages to) the server device 102 via the network 106. In yet another example where the user device 112 is outside the home environment 101, the user device 112 may transmit messages to (and/or receive messages from) devices within the home environment 101, for example, via the router 110. For example, the user device 112 may transmit a message over the network 106 that is subsequently routed to a device within the home environment 101 (e.g., the controller device 108) via the router 110. It should be understood that any suitable number and/or types of user devices may be utilized to perform embodiments of the present disclosure.

In some embodiments, an accessory device (e.g., observation camera 122) may correspond to any suitable electronic device that may be communicatively coupled to a controller device (e.g., controller device 108). In some embodiments, an accessory device may receive instructions and/or be controlled by a controller device. Some non-limiting examples of accessory devices include observation cameras, TV's (e.g., controlled by a smart media digital player controller device), smart plugs, smart thermostats, smart locks, etc. In some embodiments, the accessory device may transmit messages to (and/or receive messages from) the controller device 108 via the router 110 using the LAN (e.g., utilizing one or more suitable network protocols supported by the LAN). In some embodiments, the accessory device may directly communicate with the controller device 108 (and/or one or more other devices of the home environment 101) over the LAN without using the router 110 as an intermediary device.

Figure 2:
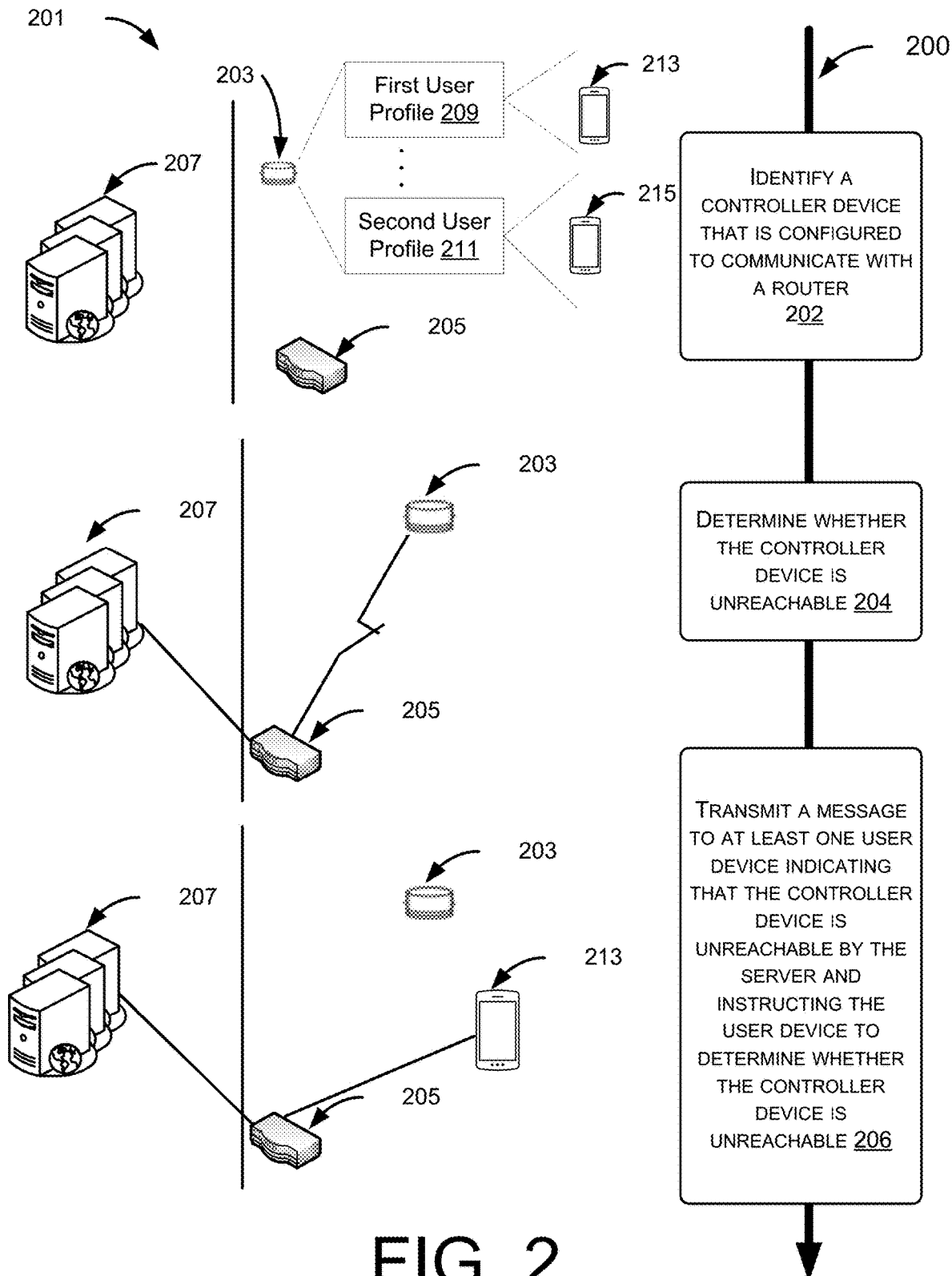
FIG. 2 is another simplified block diagram illustrating at least some example techniques for providing instructions to a user device to determine whether a controller device is unreachable, according to some embodiments.

FIG. 2 is another simplified block diagram depicting an example process performed by a system, according to some embodiments of the present disclosure. The process 200 is an example high-level process for a system (e.g., server device 102 of FIG. 1) that may provide instructions to a user device to determine whether a controller device is unreachable. The diagram 201 depicts example states that correspond to blocks of the process 200. The diagram 201 may include elements that are similar to those depicted in reference to FIG. 1. For example, a server device 207 may correspond to the server device 102, a controller device 203 may correspond to the controller device 108, and a router 205 may correspond to the router 110. One or more user profiles (e.g., a first user profile 209 and a second user profile 211) may be affiliated (e.g., associated) with the controller device 108. For each user profile, one or more user devices may be associated with the respective user profile. For example, as depicted in FIG. 2, a first user device 213 may be associated with the first user profile 209, and a second user device 215 may be associated with the second user profile 211. It should be understood that the user profiles and user devices depicted in FIG. 2 are only representative. In some embodiments, any suitable number of user profiles may be associated with the controller device 203, and/or any suitable number of user devices may be associated a particular user profile.

Turning to the process 200 in further detail, at block 202, the system may identify a controller device that is configured to communicate with a router. In some embodiments, the system (e.g., server device 207) may be geographically separated from the controller device 203, for example, as illustrated by the vertical line separating server device 207 and controller device 203 in diagram 201 of FIG. 1. For example, the server device 207 may be located at a first location that corresponds to a cloud computing platform. Meanwhile, the controller device 203 may located at a second location that may correspond to a home environment setting (e.g., home environment 101 of FIG. 1). In some embodiments, the first location and the second location may be geographically separated. In some embodiments, the controller device 203 may be configured to communicate with the server device 207 (and/or other devices) via the router 205.

For example, as described herein, the router 205 may be initially set up as an edge router that connects a LAN (e.g., associated with the home environment) to a WAN (e.g., the Internet). The router 205 may be configured in any suitable way. For example, the router 205 may assign a first set of IP addresses (e.g., utilizing IP version 4 or 6) to devices associated with the LAN. In some embodiments, the router 205 may maintain a mapping between global IP addresses, suitable for transmission over the Internet, and local IP addresses that are assigned to devices of the LAN. Continuing with the illustration depicted by diagram 201, the router 205 may be configured to receive network traffic from the controller device 203 (e.g., via a local IP address), and then transmit that traffic over the Internet to another device (e.g., server device 207). Similarly, the router 205 may also be configured to receive network traffic over the Internet (e.g., from server device 207) and route the traffic to an appropriate device on the LAN (e.g., controller device 203). Although illustrations described herein primarily describe routing of network traffic using IP addresses, it should be understood that embodiments are not so limited. For example, as described herein, other protocols, address types, and/or combinations thereof may be used by the router 205 for routing traffic and/or communicating over the LAN (e.g., media access control (MAC) addresses, Bluetooth addresses, etc.). For example, the router 205 may receive a data packet over the Internet, look up a MAC address of a particular user device, and then transmit (route) the data packet to the user device. As described herein, in some embodiments, the router 205 and the controller device 203 may be housed within the same computational unit or otherwise coupled together.

In some embodiments, the controller device 203 (e.g., a resident device of the home environment), may be configured to communicate with the server device 207. In some embodiments, this configuration may include the controller device 203 setting up an account for the home environment. In some embodiments, this account may be maintained (e.g., stored) by the server device 207 and/or the controller device 203. In some embodiments, the controller device 203 may first determine a list of user profiles that are respectively associated with users of the home environment (e.g., user devices that have registered with the controller device 203). A user profile may indicate, among other things, a list of one or more user devices associated with the user profile. For example, one user profile may be associated with a mobile phone, a smart watch, and a tablet. As depicted in FIG. 2, the first user device 213 may be associated with the first user profile 209, and the second user device 215 may be associated with the second user profile 211. Collectively, the list of user devices and user profiles may be associated with the account for the home environment associated with the controller device 203.

In some embodiments, the controller device 203 may store the list of user profiles (and associated user devices)

and then transmit (e.g., via the router 205) the list to the server device 207 (e.g., for storage by the server device 207). In some embodiments, the server device 207 may receive the list of user devices (and/or associated user profiles) prior to performing process 200 (e.g., during an initial configuration, or an update with a new addition of a user device to the home environment). In some environments, the server device 207 may receive the list of user devices while performing the process 200. For example, the server device 207 may identify that the controller device 203 already has an account set up with the server device 207, and then may transmit a message to the controller device 203 that requests for the list of user profiles (and/or user devices) associated with the home environment. In some embodiments, the list of one or more user profiles (and user devices) received by the server device 207 may be immutable other than by the controller device 203. For example, in some embodiments, only the controller device 203 may determine which user profiles (and associated user devices) are associated with the home environment. In at least this way, embodiments may prevent other unauthorized devices from requesting notification from the server device 207 in case the controller device 203 may be unreachable.

At block 204, the system may determine whether the controller device (e.g., controller device 203) is unreachable. Continuing with diagram 201 for illustration, and, as described herein, upon identifying the controller device 203 at the first location (e.g., the home environment) and receiving a list of user devices associated home environment (e.g., the controller device 203), the server device 207 may transit a ping message to the controller device 203. In some embodiments, the ping message may utilize any suitable data format (e.g., Internet Control Message Protocol (ICMP)). In some embodiments, the ping message may be sent periodically to the controller device 203 (e.g., every second, every few seconds, every minute, every few minutes, etc.) for any suitable number of periods (e.g., continuously). In some embodiments, for each ping message sent, the controller device 203 may transmit a response message (e.g., an acknowledgment) back to the server device 207. In some embodiments, the ping message may be sent to the controller device 203 via the router 205, as depicted in diagram 201. For example, the ping message may be sent over the Internet, received by the router 205, and then routed by the router 205 over the LAN to the controller device 203. In the event that the controller device 203 does not send one or more response messages back to the server device 207, then the server device 207 may determine that the controller device 203 is unreachable by the server device 207. In some embodiments, the server device 207 may determine unreachability of the controller device 203 based on any suitable procedure. For example, the server device 207 may determine the passage of a threshold amount of time between transmission of the ping message and receipt of a response to the ping message. Upon the passage of the threshold amount of time, the server device 207 may determine unreachability of the controller device 203 (illustrated in FIG. 2 by the non-continuous line between router 205 and controller device 203).

In another example, as described herein, instead of initiating a ping message, the server device 207 may receive a periodic heartbeat signal from the controller device 203. In this example, the server device 207 may determine if the controller device 203 is unreachable based at least in part on not receiving one or more heartbeat signals from the controller device 203 within a predefined period of time. It should be understood that any suitable protocol and/or procedure may be used to determine unreachability (e.g., utilizing a combination of ping messages and/or heartbeat signals).

At block 206, the system may transmit a message to at least one user device indicating that the controller device (e.g., controller device 203) is unreachable by the system (e.g., server device 207). The message may include instructions for the user device (e.g., first user device 213) to determine whether the controller device 203 is unreachable by the user device. In some embodiments, and continuing with the illustration of diagram 201, the server device 207 may retrieve a list of one or more user devices (e.g., first user device 213, second user device 215) that are associated with the particular controller device 203 for that home environment. For example, as described above, the server device 207 may have previously received a list of user profiles (e.g., first user profile 209, second user profile 211) for users that are affiliated (e.g., associated) with the controller device 203 associated with the home environment (e.g., via a registered home account). Each user profile may be associated with one or more user devices. The server device 207 may determine, using any suitable mechanism, at least one of the user devices of the plurality of devices from the list to be informed if the controller device 203 becomes unreachable by the server device 207 via the router 205. For example, one or more of the user profiles of the list may be indicated as having an "Administrator" classification, corresponding to an administrator of the controller device 203. The server device 207 may select one or more user devices based on this selection of user profiles, and then transmit the message to the one or more user devices. In the example depicted by diagram 201, first user device 213 may be selected for receiving the message (e.g., for example, based on the first user device 213 being associated with the first user profile 209, which may be an administrator profile).

In some embodiments, the server device 207 may transmit the message to the first user device 213 (and/or other user devices) using any suitable network path. For example, as depicted in FIG. 2, the server device 207 may transmit the message to first user device 213 via the router 205 that is associated with the home environment. For example, the first user device 213 may be presently within the home environment and using the LAN that is associated with the home environment. In this example, the server device 207 may transmit the message over the Internet to the router 205, and the router 205 may then route the message to the first user device 213 (e.g., using a local IP address of the first user device 213). In some examples, the router 205 may route the message to the first user device 213 using any suitable protocol (e.g., Bluetooth). In another example, where the first user device 213 may not be using the LAN (e.g., outside the home environment), the server device 207 may send the message to the first user device 213 via the Internet, using a suitable communication path. For example, the first user device 213 may receive the message via a cellular signal (e.g., while traveling in a vehicle), via a WiFi signal (e.g., utilizing a LAN at another destination), etc.

In some examples, once the first user device 213 (and/or other devices) receives the message containing instructions, the first user device 213 may determine for itself whether the controller device 203 is unreachable. For example, consider a case where the first user device 213 is present within the home environment. The first user device 213 may transmit a signal (e.g., a ping message) to the controller device 203 over the LAN, and detect whether the first user device 213 receives a response within a predefined period of time. In one example, if the first user device 213 is within a suitable physical proximity, the signal may correspond to a Bluetooth-based message that is transmitted directly over the LAN to the controller device 203 (bypassing the router 205). In another example, the first user device 213 may transmit a ping message over WiFi to the router 205, which may then route the message to the controller device 203. In yet another example, consider a case where the first user device 213 is not present within the home environment. In this example, the user device may send a ping message over Internet to the router 205, which may then route the message to the controller device 203 via the LAN. As described above, in any of these scenarios, if the controller device 203 does not respond to the message within a certain period of time, the first user device 213 may determine that the controller device 203 is unreachable by the first user device 213. As described herein, any suitable network protocol and or network path may be used by the first user device 213 to determine whether the controller device is unreachable.

Upon the first user device 213 determining that the controller device 203 is unreachable, the first user device 213 may provide a notification to the user (e.g., via display of the first user device 213). For example, the notification may notify the user that the controller device 203 was detected to be offline by the first user device 213 at a particular time. In some embodiments, if the controller device 203 is later detected to be back online and reachable by the first user device 213, the first user device 213 may provide another notification to the user. In some embodiments, the notification may be presented on the display of the user device independent of whether the controller device 203 was reachable by the server device 207. For example, the notification may be based only on whether the controller device 203 was determined to be reachable by the first user device 213. In some embodiments, upon the first user device 213 determining for itself whether the controller device 203 is reachable or unreachable, the first user device 213 may further transmit a message to the server device 207 that includes reachability information. The reachability information may indicate whether the controller device was unreachable by the first user device 213. In at least this way, the server device 207 may keep a more accurate record of reachability of controller devices that is based not only on ping messages transmitted by the server device 207 to the controller device 203, but also on reachability information determined by one or more user devices of a home environment. In some embodiments, the reachability information may also indicate that the controller device 203 was unreachable by the first user device 213 via the router 205.

In some embodiments, the server device 207 may transmit subsequent messages to each of the user devices of the list of user devices. For example, after a period of time, the server device 207 may further determine that the controller device 203 remains unreachable by the server device 207, has become reachable again, and/or any sequential combination of states thereof. In some embodiments, the server device 207 may send a subsequent one or more messages for each determination of unreachability (and/or reachability). In some embodiments, the user device(s) that receives the one or more messages from the server may be configured to only present a single notification about the controller device 203 being unreachable. In some embodiments, this single notification may be based on the determination by the user device (e.g., first user device 213) that the controller device is unreachable by the first user device 213, and not based on the original (and/or subsequent) messages received from the server. In this way, for example, the first user device 213 may reduce the number of notifications that are displayed on the first user device 213 (e.g., conserving battery power). For example, consider an earlier example where the server device 207 sent multiple messages to the first user device 213 while the user device was on a plane. Upon restoring connectivity to the Internet, the first user device 213 may determine that these messages may be stale (e.g., no longer valid). In this example, the first user device 213 may determine, based only on the first message received from the server, to ping the controller device 203 to determine reachability at the present time. It should be understood that, in general, the first user device 213 may use any suitable mechanism to determine whether and/or when to ping the controller device 203 to see if it is reachable again by the first user device 213, and whether to prompt a notification of restored reachability.

Figure 3:
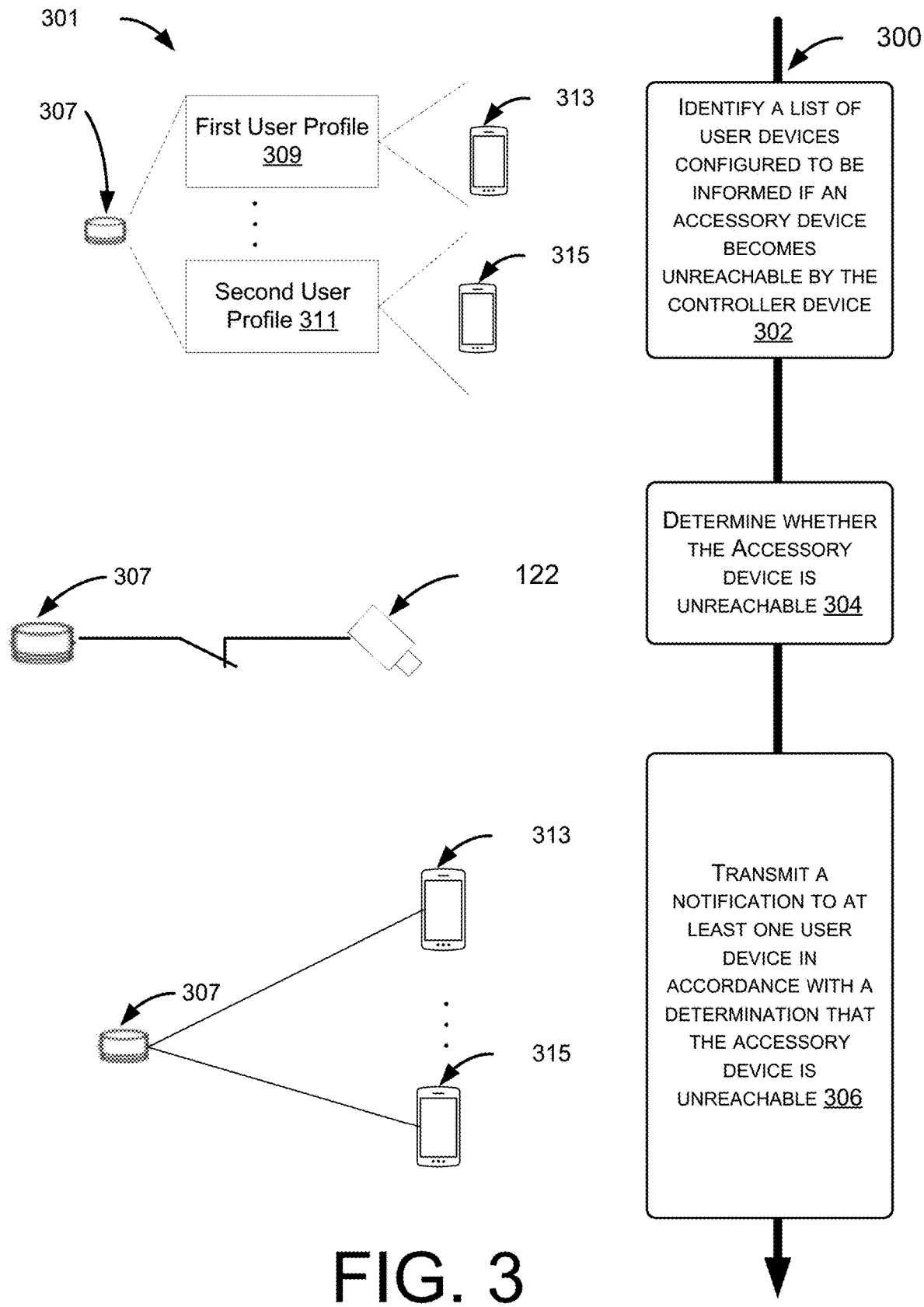
FIG. 3 is another simplified block diagram illustrating at least some example techniques for providing a notification to a user device that an accessory device is unreachable, according to some embodiments.

FIG. 3 is another simplified block diagram depicting an example process performed by a system, according to some embodiments of the present disclosure. The process 300 is an example high-level process for a system (e.g., a controller device 307) that may transmit a notification to a user device in accordance with a determination that an accessory device (e.g., an observation camera 122) is unreachable. The diagram 301 depicts example states that correspond to blocks of the process 300. The diagram 301 may include elements that are similar to those depicted in reference to FIG. 1 and/or FIG. 2. For example, the controller device 307 may correspond to the controller device 108 and/or controller device 203. A first user profile 309 and a second user profile 311 may, respectively, be similar to the first user profile 209 and the second user profile 211 of FIG. 2. Also, a first user device 313 and a second user device 315 may, respectively, be similar to the first user device 213 and the second user device 215. In some embodiments, the elements and/or operations depicted in diagram 301 may be performed in the context of a home environment (e.g., similar to home environment 101 (e.g., same building) of FIG. 1). For example, the observational camera 122 (e.g., a network-connected camera) may be positioned at a location within the home environment (e.g., at the home's front door), and may transmit data (e.g., images) over the LAN to the controller device 307. For example, the data may be used for facial recognition and/or announcing via the controller device 307 if a particular person as arrived. It should be understood that the observational camera 122 is an example of a representative accessory device, and, in some embodiments, any suitable type and/or number of accessory devices may be included in the home environment (e.g., thermostat control, smart light switch, etc.).

In some embodiments, one or more of the elements of diagram 301 may also be communicatively connected to other elements depicted herein. For example, the controller device 307 may be connected to a server device (e.g., server device 207) over a WAN (e.g., the Internet) via a router (e.g., router 205), similar to as described in reference to FIG. 2. Also, the controller device 307 and/or router device may also be connected to the one or more user devices and the one or more accessory devices over a LAN associated with the home environment. It should be understood that, while the controller device 307 and/or observational camera 122 may typically be resident within the home environment, the one or more user devices may come and go from the home environment (e.g., going to school or work, and then returning home). Accordingly, in some embodiments, a user device may communicate with the controller device 307 using different network protocols and/or paths, depending on the context. For example, a user device may communicate with the controller device 307 via the LAN within the home environment, while the user device may communicate with the controller device 307 via the Internet (e.g., being routed by the server device 207 and/or router 205) when away from the home environment. As described herein, in some cases, even when the user device is physically present within the home environment, it may still communicate with other devices of the home environment via the Internet (e.g., via cellular signal, for example, if WiFi or other LAN-based communications are turned off).

Turning to process 300 in further detail, at block 302, the system may identify a list of user devices configured to be informed if an accessory device becomes unreachable by the controller device. In some embodiments, one or more of the operations of block 302 may be similar to one or more operations of block 202. For example, using diagram 301 for illustration, the system (e.g., controller device 307) may be configured (e.g., during a setup and/or maintenance process) to be associated with one or more user profiles (e.g., first user profile 309, second user profile 311) of respective users. The user profiles may respectively correspond to users who are affiliated (e.g., associated) with the common home environment (e.g., home environment 101 of FIG. 1). Each user profile may be associated with one or more user devices (e.g., first user device 313, second user device 315). Accordingly, during the setup and/or maintenance process, the system may receive and store a list of user devices associated with the home environment. In some embodiments, the system may determine that each device of the list of user devices should be informed if an accessory device (e.g., the observation camera 122) becomes unreachable by the controller device 307 over the LAN of the home environment. In some embodiments, the system may determine that a subset of the full list of user devices associated with the home environment should be informed. For example, similar to as described in reference to FIG. 2, a subset of the user profiles may be classified as "Administrator." In one example, only those user devices associated with the subset of user profiles may be selected as candidates for being informed. Any suitable selection criteria may be used to determine which devices to be informed. It should be understood that, in some embodiments, only a select group of devices (and/or user profiles) may be authorized to configure the controller device to determine which user devices should be informed if an accessory device becomes unreachable by the controller device. As described herein, this may prevent unauthorized access and/or spoofing by other unauthorized devices.

At block 304, the system may determine whether the accessory device (e.g., observation camera 122) is unreachable. In some embodiments, one or more of the operations of block 304 may be similar to one or more of the operations of block 204 (e.g., with the controller device 307 initiating the ping messages in this case instead of the server device 207). For example, and using diagram 301 for illustration, the controller device 307 may transmit a ping message to the observational camera 122 over the LAN using any suitable network protocol (e.g., WiFi, Bluetooth, etc.). In some embodiments, the controller device 307 may transmit one or more ping messages periodically, as described herein. If the controller device 307 does not receive a response from the observational camera 122, then the controller device 307 may determine that the observational camera 122 is unreachable. For example, the controller device 307 may determine that the observational camera 122 is unreachable over the LAN in accordance with passage of a threshold amount of time between transmission of the ping message and receipt of a response to the ping message. In some embodiments, the controller device 307 may instead (and/or additionally) receive a periodic heartbeat from the observational camera, similar to as described herein. It should be understood that any suitable techniques and/or combination thereof may be used by the system to determine whether the accessory device is unreachable. It should also be understood that other data may also be transmitted between the controller device 307 and an accessory device (e.g., image data), whereby the ping messages (and/or heartbeats) may be included as part of the overall network traffic.

At block 306, the system may transmit a notification message to at least one user device in accordance with a determination that the accessory device (e.g., observational camera 122) is unreachable. In some embodiments, one or more of the operations of block 306 may be similar to one or more of the operations of block 206. For example, similar to the server device 207 of FIG. 2, the controller device 307 may retrieve the list of user devices associated with the controller device 307, previously identified at block 302. For example, the controller device 307 may retrieve the user profiles associated with the controller device 307, and thereby retrieve the list of user devices. In some embodiments, the controller device 307 may transmit the notification to each user device of the list. In some embodiments, the controller device 307 may transmit the notification to only a subset of the user devices of the list, as described herein. As depicted in diagram 301, the controller device 307 may transmit a notification to at least the first user device 313 and the second user device 315.

In some embodiments, the controller device 307 may utilize any suitable network path to transmit the notification. For example, consider a case where first user device 313 is not located in the home environment (e.g., not in the same building as the accessory device). For example, the first user device 313 may have been transported to another location (e.g., a school, a workplace, another city, etc.). In this example, the controller device 307 may transmit the notification to the first user device 313 over a WAN (e.g., via the Internet). In some embodiments, when transmitting a notification over the Internet, the controller device 307 may transmit the notification via a router (e.g., router 205). In other embodiments, the controller device 307 may transmit the notification without utilizing a router (e.g., via a direct connection to the WAN). In another example, consider a case where a user device (e.g., second user device 315) is located within the home environment. In this example, the controller device 307 may transmit the notification to the second user device 315, for example, via the LAN associated with the home environment (e.g., via the WiFi). In another example, the controller device 307 may transmit the notification to another user device using a different protocol (e.g., Bluetooth), depending on the type of device and/or the context (e.g., the distance between the devices, etc.).

In some embodiments, the controller device 307 may include any suitable contents within the notification message. For example, the controller device 307 may store (e.g., in a database) a record of when (e.g., a particular period of time) the accessory device was detected as being unreachable (e.g., over the LAN). In another example, the controller device 307 may further store a record of another period of time the accessory device was detected as being reachable. Other non-limiting examples of suitable contents may include an accessory device identifier, a potential network error condition, a network protocol used to contact the accessory device, etc. In some embodiments, the notification message may further instruct the user device to check (e.g., for itself) whether the accessory device is unreachable. In some embodiments, the notification message may not correspond to an instruction for the user device to take further action.

In some embodiments, a user device receiving the notification message, the user device may provide contents of the notification for display to the user. For example, a user device (e.g., first user device 313) may provide for presentation a dialog message that notifies the user that observation camera 122 is unreachable, and recommends that the user check the network connection. In some embodiments, some contents may be provided by the controller device 307 to a user device separate from the notification message that indicates unreachability. For example, in one embodiment, subsequent to transmitting the notification message, the controller device 307 may generate a user interface (e.g., a tabular list suitable for a graphical user interface (GUI) presentation) that indicates a first period of time when the accessory device was accessible and a second period of time when the accessory device was unreachable. The controller device 307 may then transmit the user interface to one or more of the user devices for display by at least one of the user devices on the list.

Figure 4:
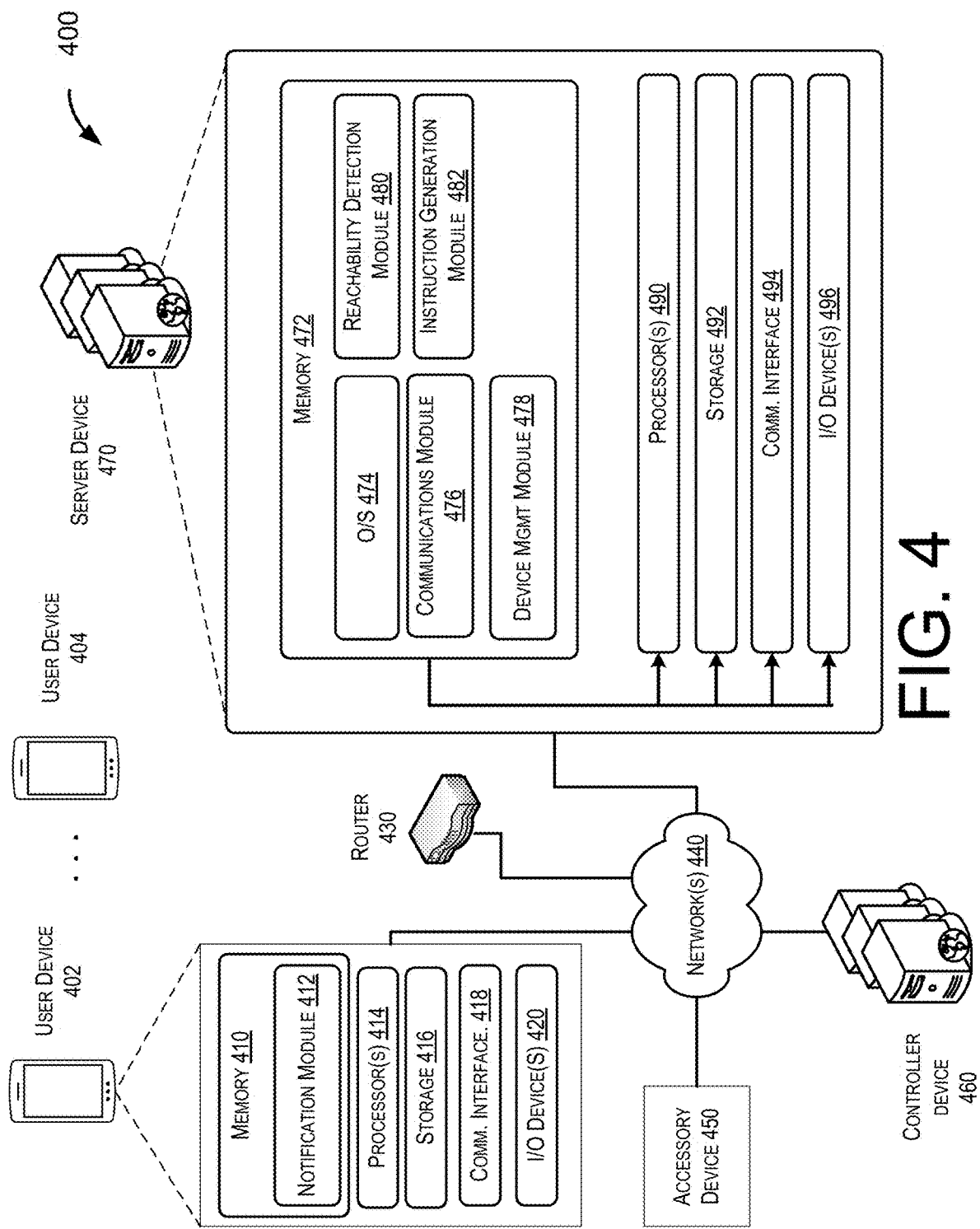
FIG. 4 is another simplified block diagram illustrating an example architecture of a system used to determining a reachability of one or more network-connected devices, according to some embodiments.

FIG. 4 is another simplified block diagram 400 illustrating an example architecture of a system used to transmit messages to one or more users devices based on determining the unreachability of another device (e.g., a controller device, an accessory device). The diagram 400 includes one or more user devices (e.g., represented by user device 402 and user device 404), a router 430, one or more network(s) 440, an accessory device 450, a controller device 460, and a server device 470. Each of these elements depicted in FIG. 4 may be similar to one or more elements depicted in other figures described herein. For example, user device 402 and 404 may be similar to any of the other user devices described herein, and so forth. In some embodiments, at least some (e.g., and/or all) elements of diagram 400 may operate within the context of a home environment (e.g., home environment 101 of FIG. 1).

Turning to each element in further detail, a user device may be any suitable computing device (e.g., a mobile phone, tablet, personal computer (PC), smart glasses, a smart watch, etc.). For example, as depicted in FIG. 4, the user device 402 and user device 404 both be mobile phones. Depending on the type of user device and/or location of the user device (e.g., within the home environment or outside the home environment), the user device may be enabled to communicate using one or more network protocols (e.g., a Bluetooth connection, a Thread connection, a ZigBee connection, an Infrared connection, a WiFi connection, etc.) and/or network paths over the network(s) 440 (e.g., including a LAN and/or WAN), described further herein. In some embodiments, a user device will be connected to another device (e.g., a TV), through which the user device may provide data (e.g., notification messages, instructions, user interfaces) for presentation. As a representative example, the user device 402 has at least one memory 410, one or more processing units (or processor(s)) 414, a storage unit 416, a communications interface 418, and an input/output (I/O) device(s) 420.

The processor(s) 414 may be implemented as appropriate in hardware, computer-executable instructions, firmware or combinations thereof. Computer-executable instruction or firmware implementations of the processor(s) 414 may include computer-executable or machine executable instructions written in any suitable programming language to perform the various functions described.

The memory 410 may store program instructions that are loadable and executable on the processor(s) 414, as well as data generated during the execution of these programs. Depending on the configuration and type of user device 402, the memory 410 may be volatile (such as random access memory (RAM)) and/or non-volatile (such as read-only memory (ROM), flash memory, etc.). In some implementations, the memory 410 may include multiple different types of memory, such as static random access memory (SRAM), dynamic random access memory (DRAM) or ROM. The user device 402 may also include additional storage 416, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the storage 416 may be utilized to store data contents received from one or more other devices (e.g., server device 470, controller device 460). For example, the storage 416 may store notifications regarding unreachability of one or more devices (e.g., controller device 460, accessory device 450), data corresponding to periods of time that a particular device was reachable (e.g., online) or unreachable (e.g., offline), etc. In some embodiments, the contents may be later retrieved to be provided for presentation.

The user device 402 may also contain the communications interface 418 that allow the user device 402 to communicate with a stored database, another computing device or server, user terminals, and/or other devices on the network(s) 440. The user device 402 may also include I/O device(s) 420, such as for enabling connection with a keyboard, a mouse, a pen, a voice input device, a touch input device, a display, speakers, a printer, etc.

Turning to the contents of the memory 410 in more detail, the memory 410 may include an operating system and one or more application programs or services for implementing the features disclosed herein, including a notification module 412. The notification module 412 may be responsible for performing one or more tasks described herein, including, for example, receiving and processing a notification message from a device (e.g., accessory device 450, controller device 460, server device 470, etc.). In some embodiments, the notification module 412 may present contents of a message for presentation. In some embodiments, the notification module 412 may transmit messages to one or more other devices. For example, the notification module 412 may receive an instruction message from a server device 470 to further determine if the controller device 460 is reachable or not. Upon receiving the instruction, the notification module 412 may transmit a message (e.g., a ping message) to the controller device 460.

In some embodiments, the router 430 may be any suitable network device that forwards data packets between computer networks. For example, as described herein, the router 430 may be an edge (e.g., border) router than connects a LAN that is associated with the home environment with a WAN (e.g., the Internet). In some embodiments, the router 430 may be communicatively and/or physically coupled with the controller device 460.

In some embodiments the one or more network(s) 440 may include a WAN (e.g., similar to external network 106 of FIG. 1) and/or a LAN. As described herein, the home environment may be associated with the LAN, whereby devices present within the home environment may communicate with each other over the LAN. As described herein, the WAN may be external from the home environment, whereby the router 430 enables traffic from the LAN to be transmitted to the WAN, and vice versa. In some embodiments, the server device 470 may be external to the home environment, and thus, communicate with other devices over the WAN. In some embodiments, the controller device 460 and/or accessory device 450 may typically be resident within the home environment and communicate with other devices of the home environment over the LAN. In some embodiments, the user devices may be transient. For example, as described herein, a user device may be present within the home environment (e.g., and communicate over the LAN), while, in another example, the user device may be outside the home environment and communicate over the Internet (or other suitable network).

As described herein, the accessory device 450 may correspond to any suitable electronic device that may be communicatively coupled to a controller device (e.g., controller device 460). In some embodiments, an accessory device may receive instructions and/or be controlled by a controller device. Some non-limiting examples of accessory devices include observation cameras, TV's (e.g., controlled by a smart media digital player controller device), smart plugs, smart thermostats, smart locks, etc.

In some embodiments, the controller device 460 may perform any one or more of the operations of controller devices described herein (e.g., with reference to FIGS. 2 and/or 3). For example, with reference to FIG. 2, the controller device 460 may respond to ping messages by the server device 470. In another example, with reference to FIG. 3, the controller device 460 may ping one or more accessory devices to determine the reachability of each accessory device. The controller device 460 may also communicate with user devices (e.g., replying to a ping message, transmitting to a user device a notification of unreachability of an accessory device, transmitting to a user device a user interface indicating periods of time when an accessory device was reachable and/or unreachable, etc.). In some embodiments, the controller device 460 may include one or more elements that are similar to server device 470, described in more detail below. For example, the controller device 460 may include modules in a memory of the controller device 460. The modules may comprise code that causes a processor of the controller device 460 to communicate with other devices, manage devices (e.g., determining which devices to notify), determine reachability of devices (e.g., accessory devices), and/or generate instructions and/or notification messages.

Turning to server device 470 in further detail, the server device 470 may be a computer system that comprises at least one memory 472, one or more processing units (or processor(s)) 490, a storage unit 492, a communication device 494, and an I/O device 496. In some embodiments, these elements may be implemented similarly (or differently) than as described in reference to similar elements of user device 402. In some embodiments, the storage unit 492 may store data received from one or more devices of diagram 400. For example, the storage unit 492 may store a list of user profiles and/or a list of user devices of the home environment. The storage unit 492 may also store one or more configuration settings (e.g., how often to ping a controller device, which user devices to transmit instructions, etc.).

Turning to the contents of the memory 472 in more detail, the memory 472 may include an operation system 474 and one or more application programs or services for implementing the features disclosed herein, including a communications module 476, a device management module 478, a reachability detection module 480, and an instruction generation module 482. In some embodiments, any one or more of the application programs or services of the server device 470 (or any other features of server devices described herein) may be used to implement the reachability detection service 104 of FIG. 1.

The communications module 476 may comprise code that causes the processor 490 to generate messages, forward messages, reformat messages, and/or otherwise communicate with other entities. For example, as described herein the communications module 476 may transmit ping messages to the controller device 460. In another example, the communications module 476 may transmit messages to one or more user devices, including instructions for at least one of the user devices to determine whether the controller device 460 is unreachable by the user device, as described herein.

The device management module 478 may comprise code that causes the processor 490 to manage one or more devices associated with the home environment. For example, the device management module 478 may create and/or receive user profiles of users and/or user devices associated with the home environment. The device management module 478 may also determine one or more settings. For example, the device management module 478 may determine which one or more devices to notify in the event that a device (e.g., the controller device 460) is unreachable.

The reachability detection module 480 may comprise code that causes the processor 490 to determine whether a device (e.g., controller device 460) is unreachable. As described herein, this determination may be performed based in part on using ping messages and/or heartbeats.

The instruction generation module 482 may comprise code that causes the processor 490 to generate notifications and/or instructions that are transmitted to a user device. For example, the instruction generation module 482 may generate a notification that the controller device 460 is unreachable by the server device 470. The instruction generation module 482 may also generate instructions for a user device to determine whether the controller device 460 is reachable by the user device. It should be understood that instructions and/or notifications may be sent to more than one user device.

Figure 5:
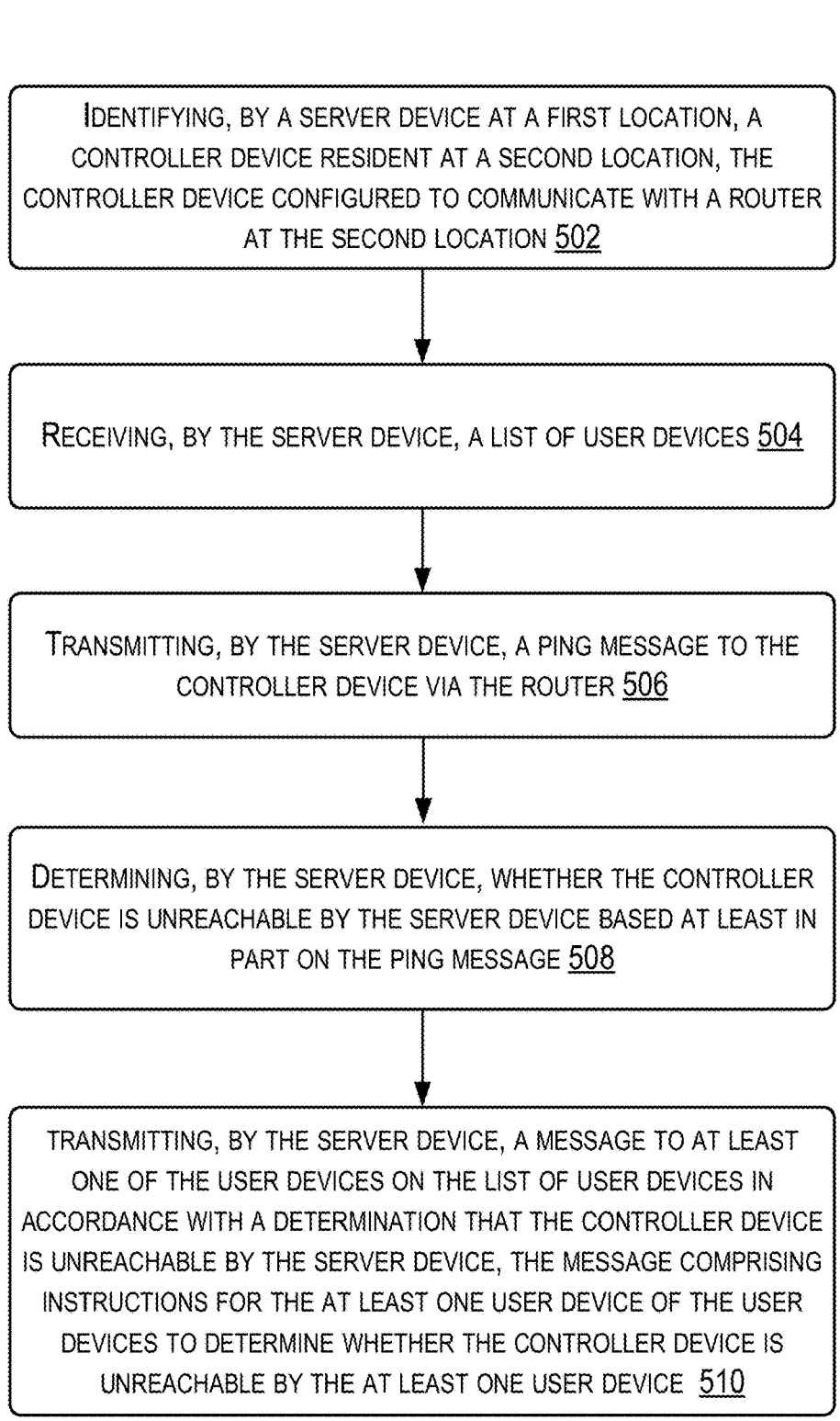
FIG. 5 is a simplified flow diagram illustrating an example process for providing instructions to a user device to determine whether a controller device is unreachable, according to some embodiments.

FIG. 5 is a simplified flow diagram illustrating an example process 500 for providing instructions to a user device to determine whether a controller device is unreachable, according to some embodiment. Process 500 and process 600 of FIG. 6 (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

In some embodiments, process 500 may be performed by a server device, which may correspond to any one or more of the server devices described herein. In some embodiments, one or more of the operations of process 500 may be similar to as described in reference to FIG. 2. At block 502, the server device may identify, at a first location, a controller device that is resident at a second location, whereby the server device may be configured to communicate with a router at the second location. In one example, and as described herein, the first location may correspond to the location of a cloud computing platform, and the second location (e.g., different from the first location) may correspond to a home environment. The controller device (e.g., a smart speaker) may be configured to communicate with the server device via the router.

At block 504, the server device may receive a list of user devices. In some embodiments, the list of user devices is received from the controller device via the router. In some embodiments, the server device may also receive a list of user profiles of users associated with the home environment. In some embodiments, each user profile may be associated with one or more user devices of the list of user devices. In some embodiments, the server device may also determine a subset of the list of user devices, whereby the subset indicates user devices that should be notified in the event that the server device determines that the controller device is unreachable by the server device via the router. In some embodiments, the list of user devices may be associated with a same account as the controller device (e.g., a customer account). In some embodiments, the list of user devices received by the server device is immutable other than by the controller device.

At block 506, the server device may transmit a ping message to the controller device via the router. In some embodiments, the ping message may be transmitted to the controller device over the Internet, and then routed via the router to the controller device over the LAN of the home environment. In some embodiments, the ping message may be transmitted on a predefined interval.

At block 508, the server device may determine whether the controller device is unreachable by the server device based at least in part on the ping message. For example, the server device may determine that the controller device is unreachable via the router in accordance with the passage of a threshold amount of time between transmission of the ping message and receipt of a response to the ping message. In some embodiments, as described herein, a heartbeat signal may be received by the server device from the controller device, and may be used to determine whether the controller device is unreachable by the server device. In some embodiments, the heartbeat may be used to determine reachability independently from the ping message.

At block 510, the server device may transmit a message to at least one of the user devices on the list of user devices in accordance with a determination that the controller device is unreachable by the server device. The message may include instructions for the user device(s) to determine whether the controller device is unreachable by the user device(s). In some embodiments, the user device(s) that receive the message may further determine whether the controller device is unreachable by the respective user device based at least in part on the user device attempting to reach the controller device via the router. In some embodiments, the server device may receive reachability information from at least one user device indicating whether the controller device was unreachable by the user device. In some embodiments, the reachability information may indicate whether the controller device was reachable via the router and/or the LAN via any suitable connection (e.g., Bluetooth connection, Thread connection, etc.). In some embodiments, upon receipt of the instructions by a user device and determining whether the controller device is reachable by the user device, the user device may present a notification on a display associated with the user device (e.g., indicating that the controller device is unreachable). In some embodiments, the server device may transmit subsequent messages to each user device, for example, upon subsequent determinations indicating that the controller device is unreachable by the server device. In some embodiments, a user device may be configured to present only a single notification about the controller device being unreachable. The single notification may be based on a determination by the user device that the controller device is unreachable by the user device, and not based on the message or any subsequent messages received by the user device.

Figure 6:
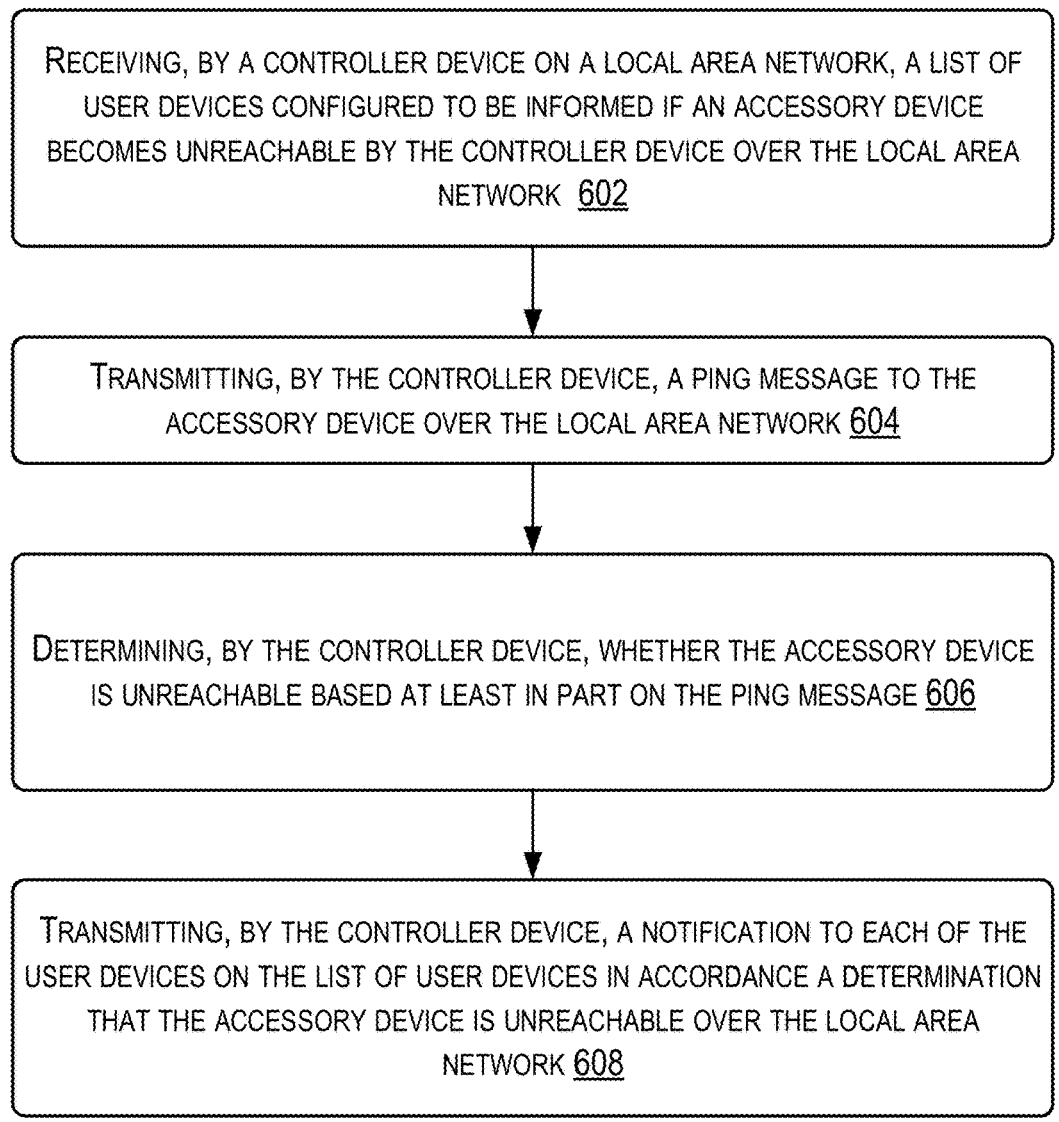
FIG. 6 is another simplified flow diagram illustrating an example process for providing a notification to a user device that an accessory device is unreachable, according to some embodiments.

FIG. 6 is another simplified flow diagram illustrating an example process for providing a notification to a user device that an accessory device is unreachable, according to some embodiments. In some embodiments, the process 600 may be performed by a controller device, which may be any of the controller devices described herein. In some embodiments, one or more of the operations of process 600 may be similar to as described in reference to FIG. 3.

At block 602, the controller device may receive, on a LAN, a list of user devices configured to be informed if an accessory device becomes unreachable by the controller device over the LAN. In some embodiments, the controller device may be a resident device that is located within a same building as the accessory device (e.g., a network-connected observation camera), for example, as depicted in reference to FIG. 1. In some embodiments, one or more of the operations of this block may be similar one or more operations of block 504. In this case, the controller device may receive the list of user devices (e.g., instead of (and/or in addition to) the server device receiving the list of user devices). In some embodiments, as described herein, the LAN may be associated with a home environment that corresponds to the home (e.g., a building). For example, the router may be located in the home, and route traffic received from the Internet to devices within the home.

At block 604, the controller device may transmit a ping message to the accessory device over the LAN. In some embodiments, one or more of the operations of this block may be similar one or more operations of block 506. In this case, the controller device may transmit the ping message to the accessory device over the LAN (e.g., instead of a WAN) based at least in part on both devices being included within the home environment (e.g., receiving messages over the LAN).

At block 606, the controller device may determine whether the accessory device is unreachable based at least in part on the ping message. In some embodiments, one or more of the operations of this block may be similar one or more operations of block 508. In this case, it is the controller device (e.g., instead of the server device) that determines unreachability. Also, here the accessory device is determined as being unreachable (e.g., instead of the controller device being determined as unreachable, as in block 508). Also, similar to block 508, the accessory device may be determined to be unreachable when the response to the ping message is not received within a particular amount of time.

At block 608, the controller device may transmit a notification to each of the user devices on the list of user devices. The notification may be in accordance with a determination that the accessory device is unreachable over the LAN. In some embodiments, at least one of the user devices may not be in the same building as the accessory device (e.g., not within the home environment). In this case, the user device may receive the notification over the WAN (instead of the LAN). In some embodiments, the user device may be in the same building as the accessory device, and may receive the notification over the LAN. In some embodiments, the controller device may also generate a user interface that indicates at least a first period of time when the accessory device was reachable and at least a second period of time when the accessory device was unreachable. The controller device may then transmit the user interface to each of the user devices on the list for display by at least one of the user devices on the list.

Other preferred and non-limiting embodiments or aspects will be set forth in the following numbered clauses:

Clause 1: A method, comprising: receiving, by a controller device on a local area network, a list of user devices configured to be informed if an accessory device becomes unreachable by the controller device over the local area network; transmitting, by the controller device, a ping message to the accessory device over the local area network; determining, by the controller device, whether the accessory device is unreachable based at least in part on the ping message; and transmitting, by the controller device, a notification to each of the user devices on the list of user devices in accordance a determination that the accessory device is unreachable over the local area network.

Clause 2: The method of clause 1, wherein the controller device is a resident device located within a same building as the accessory device.

Clause 3: The method of clause 2, wherein at least one of the user devices is not located with the same building as the accessory device Clause 4: The method of any of clauses 1-3, wherein the accessory device is a network-connected camera.

Clause 5: The method of any of clauses 1-4, wherein the accessory device is determined to be unreachable when a response to the ping message is not received within a particular amount of time.

Clause 6: The method of any of clauses 1-5, further comprising: generating, by the controller device, a user interface that indicates at least a first period of time when the accessory device was reachable and at least a second period of time when the accessory device was unreachable; and transmitting, by the controller device, the user interface to each of the user devices on the list for display by at least one of the user devices on the list.

Other embodiments of the disclosure may be directed to a computer system comprising: a memory that stores computer-executable instructions; and one or more processors configured to access the memory and execute the computer-executable instructions to implement the method of any one of clauses 1-6.

Other embodiments of the disclosure may be directed to a computer-readable medium storing computer-executable instructions for controlling one or more processors to perform the method of any one of clauses 1-6.

Illustrative techniques for transmitting a message based on determining that a device is unreachable are described above. Some or all of these techniques may, but need not, be implemented at least partially by architectures such as those shown at least in FIGS. 1-6 above. While many of the embodiments are described above with reference to server devices, controller devices (e.g., resident devices), accessory devices, and user devices, it should be understood that other types of computing devices may be suitable to perform the techniques disclosed herein. Further, in the foregoing description, various non-limiting examples were described. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C # or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium that can be used to store the desired information and that can be accessed by the a system device. Based at least in part on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a," "an," and "the," and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based at least in part on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

As described above, one aspect of the present technology is the gathering and use of data (e.g., user profiles, user device information). The present disclosure contemplates that in some instances, this gathered data may include personally identifiable information (PII) data that uniquely identifies or can be used to contact or locate a specific person. Such personal information data can include facial characteristics, demographic data, location-based data (e.g., GPS coordinates), telephone numbers, email addresses, Twitter ID's, home addresses, or any other identifying or personal information.

The present disclosure recognizes that the use of such personal information data, in the present technology, can be used to the benefit of users. For example, the personal information data can be used to notify a particular person that a particular device is unreachable, and may need servicing.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of services related to performing facial recognition, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A method, comprising:
   identifying, by a server device at a first location, a controller device resident at a second location, the controller device configured to communicate with a router at the second location;
   receiving, by the server device, a list of user devices;
   transmitting, by the server device, a ping message to the controller device via the router;
   determining, by the server device, whether the controller device is unreachable by the server device based at least in part on the ping message; and
   transmitting, by the server device, a message to at least one of the user devices on the list of user devices in accordance with a determination that the controller device is unreachable by the server device, the message comprising instructions for the at least one user device of the user devices to determine whether the controller device is unreachable by the at least one user device.

2. The method of claim 1, wherein the determination of whether the controller device is unreachable by the at least one user device is based at least in part on the at least one user device attempting to reach the controller device via the router.

3. The method of claim 1, further comprising receiving, by the server device, reachability information from the at least one user device that indicates whether the controller device was unreachable by the at least one user device.

4. The method of claim 3, wherein the reachability information identifies that the controller device was unreachable by the at least one user device via the router.

5. The method of claim 1, wherein the router is reachable by the server device via a wide area network.

6. A first device, comprising:
   a memory comprising computer-executable instructions; and
   one or more processors in communication with the memory and configured to access the memory and execute the computer-executable instructions to perform, at least:
   identifying, at a first location, a controller device resident at a second location, the controller device configured to communicate with a router at the second location;
   receiving a list of user devices;
   transmitting a ping message to the controller device via the router;

determining whether the controller device is unreachable by the first device based at least in part on the ping message; and transmitting a message to at least one of the user devices on the list of user devices in accordance with a determination that the controller device is unreachable by the first device, the message comprising instructions for the at least one user device of the user devices to determine whether the controller device is unreachable by the at least one user device.

7. The first device of claim 6, wherein the at least one user device is configured to, based at least in part on receipt of the message from the first device:

ping the controller device;

determine whether the controller device is reachable by the at least one user device; and present a notification on a display of the at least one user device in accordance with a determination that the controller device is unreachable by the at least one user device.

8. The first device of claim 7, wherein the at least one user device is configured to present the notification independent of whether the controller device was reachable by the first device.

9. The first device of claim 6, further comprising:

transmitting subsequent messages to each of the user devices upon subsequent determinations that the controller device is unreachable by the first device, wherein the at least one user device is configured to only present a single notification about the controller device being unreachable, the single notification being based at least in part on a determination, by the at least one user device, that the controller device is unreachable by the at least one user device and not based at least in part on any of the message or the subsequent messages.

10. The first device of claim 6, wherein the at least one user device is configured to reach the controller device via at least one of a Bluetooth connection, a Thread connection, a ZigBee connection, an Infrared connection, or a WiFi connection.

11. The first device of claim 6, wherein the list of user devices received by the first device is immutable other than by the controller device.

12. The first device of claim 6, wherein the message is further transmitted to each of the user devices in accordance with a determination that the router is unreachable by the first device.

13. The first device of claim 6, wherein the list of user devices is received from the controller device via the router.

14. The first device of claim 6, wherein user devices of the list of user devices are associated with a same account as the controller device.

15. One or more non-transitory computer-readable storage media comprising computer-executable instructions that, when executed by one or more processors of a first device, cause the one or more processors to perform, at least:

identifying, at a first location, a controller device resident at a second location, the controller device configured to communicate with a router at the second location;

receiving a list of user devices;

transmitting a ping message to the controller device via the router;

determining whether the controller device is unreachable by the first device based at least in part on the ping message; and transmitting a message to at least one of the user devices on the list of user devices in accordance with a determination that the controller device is unreachable by the first device, the message comprising instructions for the at least one user device of the user devices to determine whether the controller device is unreachable by the at least one user device.

16. The one or more non-transitory computer-readable storage media of claim 15, wherein the user devices on the list comprise a plurality of devices configured to be informed if the controller device becomes unreachable by the first device via the router.

17. The one or more non-transitory computer-readable storage media of claim 15, wherein the first device determines that the controller device is unreachable via the router in accordance with passage of a threshold amount of time between transmission of the ping message and receipt of a response to the ping message.

18. The one or more non-transitory computer-readable storage media of claim 15, wherein the determination of whether the controller device is unreachable by the at least one user device is based at least in part on the at least one user device attempting to reach the controller device via the router.

19. The one or more non-transitory computer-readable storage media of claim 15, wherein the instructions further comprise:

transmitting subsequent messages to each of the user devices upon subsequent determinations that the controller device is unreachable by the first device, wherein the at least one user device is configured to only present a single notification about the controller device being unreachable, the single notification being based at least in part on a determination, by the at least one user device, that the controller device is unreachable by the at least one user device and not based at least in part on any of the message or the subsequent messages.

20. The one or more non-transitory computer-readable storage media of claim 15, wherein the message is further transmitted to each of the user devices in accordance with a determination that the router is unreachable by the first device.

* * * * *